US007742617B2

(12) United States Patent
Smith et al.

(10) Patent No.: US 7,742,617 B2
(45) Date of Patent: Jun. 22, 2010

(54) DOCUMENT GENEALOGY

(75) Inventors: Mark D. Smith, Huntsville, AL (US);
John D. Simmons, Madison, AL (US)

(73) Assignee: Bentley Systems, Inc., Exton, PA (US)

( * ) Notice: Subject to any disclaimer, the term of this patent is extended or adjusted under 35 U.S.C. 154(b) by 1055 days.

(21) Appl. No.: 11/132,182

(22) Filed: May 19, 2005

(65) Prior Publication Data

US 2005/0273698 A1    Dec. 8, 2005

Related U.S. Application Data

(60) Provisional application No. 60/572,103, filed on May 19, 2004.

(51) Int. Cl.
*G06K 9/00*    (2006.01)
(52) U.S. Cl. .................................................. 382/100
(58) Field of Classification Search ................ 382/100; 713/176
See application file for complete search history.

(56) References Cited

U.S. PATENT DOCUMENTS 5,671,282 A * 9/1997 Wolff et al. ................ 713/179
6,141,753 A * 10/2000 Zhao et al. ................. 713/176
6,427,032 B1 * 7/2002 Irons et al. ................. 382/306
6,898,625 B2 * 5/2005 Henry et al. ............... 709/206
6,925,599 B2 * 8/2005 Wood ........................ 715/229
7,085,755 B2 * 8/2006 Bluhm et al. ............... 707/3

* cited by examiner

*Primary Examiner*—Tom Y Lu
(74) *Attorney, Agent, or Firm*—Venable LLP; Jeffri A. Kaminski; Christopher Ma

(57) ABSTRACT

A computer-readable medium contains software that, when read by a computer, causes the computer to perform a method for tracing a document. The method includes: on the computer, generating a global unique identifier (GUID) for a master document; embedding the GUID in the master document; making a copy of the master document available for viewing on another computer, wherein the copy of the master document includes the embedded GUID; receiving a version verification request from the other computer about the copy, wherein the version verification request includes the GUID from the copy; and providing a latest version of the master document referenced by the GUID from the copy to the second computer in response to the version verification request.

20 Claims, 7 Drawing Sheets

DOCUMENT GENEALOGY

CROSS-REFERENCE TO RELATED APPLICATION

The present application claims the benefit of U.S. Patent Application No. 60/572,103, filed May 19, 2004 entitled "Document Genealogy," to Mark D. Smith et al., of common assignee to the present invention, the contents of which are incorporated herein by reference in their entirety.

BACKGROUND OF THE INVENTION

1. Field of the Invention

The present invention relates generally to electronic document management, and more particularly to ensuring the currency of distributed or published information.

2. Related Art

Documents are commonly used to distribute or convey information. Most documents today may be stored in electronic form and managed by a document management system. Documents may take many different forms, such as academic papers, design drawings, specifications, etc. For a document to be useful it must be distributed to individuals that need access to the information it contains. Many times this means that the document will become remote from the author. The author then no longer has any control over the document or the information contained therein.

For example, a specification for a product to be manufactured may be created by an engineer. The engineer's copy of the specification is the original master document. The engineer may distribute copies of the specification to people in the product marketing department or others. The engineer no longer has control over the copies of the specification. The engineer does not know what use others are making of the specification's contents. Furthermore, the engineer may not even know who has the specification. The marketing person may have sent the specification to others, who may have distributed the document even further.

If some key information is inadvertently omitted from the master document and this information is later added to the original master document, there is no way for others who have the distributed version of the document to realize that there is a newer version of the document available.

Established methods available to insure that the most up to date information is available include many manual processes that put the burden to validate the freshness of data on the information consumer. These methods do not provide the publisher of the information any assurance that the correct information is being used. Many of the current processes require that personal contact information be included with the published document. The information consumer is required to contact someone to insure that they have the latest information. Other processes require that detailed records be kept of everyone that has received the information. The publisher manually contacts everyone that has received the information whenever updates are produced. In some cases, when the publisher releases the information, they guess what the useful lifetime of the information is. Then they establish an expiration date for the information. The information may include labels such as "This information valid through MM/DD/YY". Information distributed electronically may automatically expire. If the information consumer tries to open the published document after the expiration date the published document viewer will inform the user that the information has expired, regardless of whether the information is still actually valid.

What is needed then is an improved approach to ensuring currency of published information that overcomes shortcomings of conventional solutions.

SUMMARY OF THE INVENTION

In an exemplary embodiment of the present invention a computer-implemented method for tracing a document is disclosed.

In an exemplary embodiment of the invention, an identifier is provided for a master document. The identifier allows the master document to be globally and uniquely identifiable. The identifier may identify and point to the master document. The identifier may take many forms. When a copy of the document is accessed, the identifier may be used to determine if any newer versions of the master document exist.

Information consumers may be able to reassure themselves that they are using current information through a visual inspection of the data that was used to produce the published document. Publishers may be provided a way to automate the inspection process so that when published information is viewed, it is automatically checked to insure that it is current. This greatly reduces errors introduced by individuals conducting their work with old information.

In an exemplary embodiment, the invention may be a computer-readable medium containing software that, when read by a computer, causes the computer to perform a method for tracing a document, the method comprising: on the computer, generating a global unique identifier (GUID) for a master document; embedding the GUID in the master document; making a copy of the master document available for viewing on another computer, wherein the copy of the master document includes the embedded GUID; receiving a version verification request from a second computer about the copy, wherein the version verification request includes the GUID from the copy; and providing a latest version of the master document referenced by the GUID from the copy to the second computer for version verification.

Generating the GUID may further include: selecting at least one of: a machine host address for the first computer and a document identifier for the master document, or a name of a document management system (DMS) server and a document identifier of the master document in the DMS.

The embodiment may further include visually comparing the latest version of the master document and the copy.

The embodiment may further include performing a software comparison between the latest version of the master document and the copy.

In another embodiment, making a copy of the master document available for viewing may include publishing the master document and including the GUID in the published document. The publishing may include creating the copies in at least one of: a CALS format, a TIFF format, a PDF format, a DWF format, or a Metro format.

Generating a GUID for the master document may include generating a GUID for each document embedded in or linked to the master document. Embedding the GUID in the master document may include embedding the GUIDs for each document embedded in or linked to the master document.

In another exemplary embodiment, the invention may be a computer-readable medium containing software that, when read by a computer, causes the computer to perform a method for tracing a document, the method comprising: on a first computer, generating a global unique identifier (GUID) for a master document; generating a fingerprint for the master document; embedding the GUID and the fingerprint in the master document; making a copy of the master document available for viewing on another computer, wherein the copy of the master document includes the embedded GUID and fingerprint; receiving a version verification request from a second computer about the copy, wherein the version verification request includes the GUID and the fingerprint from the copy; comparing the fingerprints from the copy and the master document; and returning a comparison result.

Comparing the fingerprints may further comprise: generating a new fingerprint for the master document; comparing the fingerprint in the version verification request to the new fingerprint; and indicating that the master document has been revised when the fingerprint in the version verification request and the new fingerprint are not identical.

Generating the fingerprint includes at least one of: calculating a checksum of the master document; or selecting a last modified date in the master document.

In another embodiment, making copies of the master document available may include publishing the master document and including the GUID in the published document. Publishing may include creating the copies in at least one of: a CALS format, a TIFF format, a PDF format, a DWF format, or a Metro format.

Generating a GUID and a fingerprint for the master document includes generating a GUID and a fingerprint for each document embedded in or linked to the master document.

In some embodiments, embedding the GUID and the fingerprint in the master document may include embedding the GUIDs and fingerprints for each document embedded in or linked to the master document.

The embodiments may further include generating a fingerprint and a GUID for a sub-section of the master document.

The embodiments may further include: performing at least one of the following when the comparison result indicates that the copy and the master document are not the same version: denying the ability to view the copy; providing a copy of the latest version of the master document; presenting a warning that the copy is not the latest version of the master document; or applying a watermark on a printed copy of the copy.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF EMBODIMENTS OF THE PRESENT INVENTION

Figure 1:
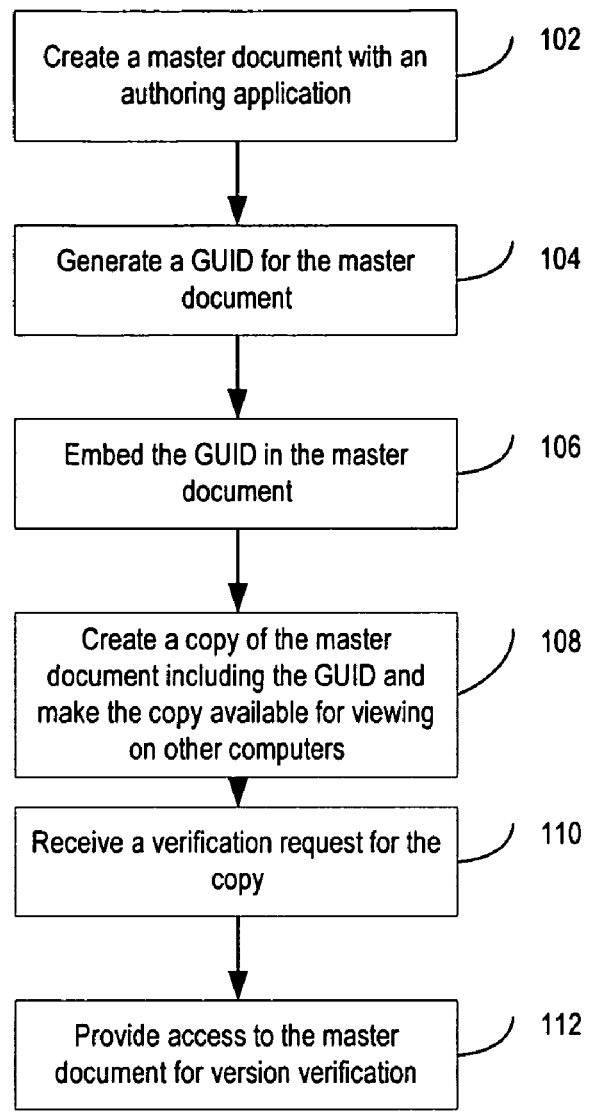
FIG. 1 depicts an exemplary flowchart according to an embodiment of the present invention.

An exemplary embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

In order to ensure that the most current version of a document is being used, the document may be provided with a global, unique identifier (GUID) that identifies or points to the document. The concept of a GUID is substantially analogous to how a person may be uniquely identified. For example a person may be identified as: John D. Smith, 111 Valley Dr. Huntsville, Ala. 12345 USA. That same person may also be (01(Country Code) 412 (Area Code) 5550240 (phone number)) and John.Smith@Bentley.com. All of these are examples of GUIDs that point to John Smith.

In the context of embodiments of the present invention, a specific type of GUID is neither prescribed nor necessary. As long as the GUID is persistent for the life of a document, any GUID will work. In some embodiments, the GUID may exploit some standard so that commonly available tools can be used.

For example, ProjectWise available from Bentley Systems of Exton, Pa. enables the creation of a uniform resource locator (URL) that can serve as a GUID in one embodiment of the invention. The URL GUID points to the document in a globally unique way. This URL can be provided to a web browser, such as, for example, Internet Explorer from Microsoft Corporation, to navigate to the master document from any networked computer in the world. Other examples of GUIDs may include a machine host address for the authoring computer and a document identifier for the master document, or the name of a document management system (DMS) server and a document identifier of the master document in the DMS.

Embodiments of the present invention may also support the practice amongst computer users of creating two types of documents. A first type of document is created by the document author using a computer program that is designed to assist the author in composing a certain type of information for a particular purpose. For example, a document author may use a word processing program to create a contract, user manual, materials specification, etc. Another author may create an accounts receivable schedule using a spreadsheet program.

The author needs to be able to distribute information contained within the document but he also needs to protect the content of the document from inadvertent or malicious editing. As a result, many document authors do not want to distribute the data created by the authoring application because the data can be easily modified by anyone who has the authoring application. Instead, in a second type of document, a published version of the document is created. This is often done using the printing features of the authoring application. The published version of the document allows the information to be distributed electronically without the risk of inadvertent or malicious changes being introduced. There are many formats that users have exploited for publishing purposes. These formats include raster image formats such as CALS and TIFF. Other vector and raster formats include HPGL2, PostScript, PDF, DWF from Autodesk, and "Metro" from Microsoft Corporation. Embodiments of the present invention may be applied to these or any publishing format.

FIG. 1 illustrates a first embodiment. In block 102, a master document is created in an authoring application, such as, e.g. Microsoft Word. In block 104, a globally unique identifier (GUID) is generated for the master document. The authoring program, the operating system, a document management system, or some other computer system may generate the GUID. The GUID may be, for example, a URL, or a combination of a machine host address for the authoring computer and a document identifier for the master document, or a combination of the name of a document management system (DMS) server and a document identifier of the master document in the DMS, or another unique identifier.

In block 106, the GUID may be embedded in the master document. In block 108, a copy of the master document is created and made available for viewing by others on other computers. The copy may include the embedded GUID. For example, the copy may be e-mailed, archived, posted for downloading from a server, downloaded from a server, or other otherwise made available. A copy of the master document may be created before the generation of a GUID for the master document. Once the GUID for the master document is generated, it may then be embedded in the copy.

In block 110, if a user or viewer of the document wishes to know if the copy is the latest version, a version verification request may be sent from the user's computer and received by the original, authoring computer. The version verification request may include the GUID embedded in the copy. The authoring computer may use the GUID provided in the version verification request to provide access to the correct master document in block 112. The user may then visually compare the master and the copy, or may use a software document comparison application to detect differences in the two documents.

Figure 2:
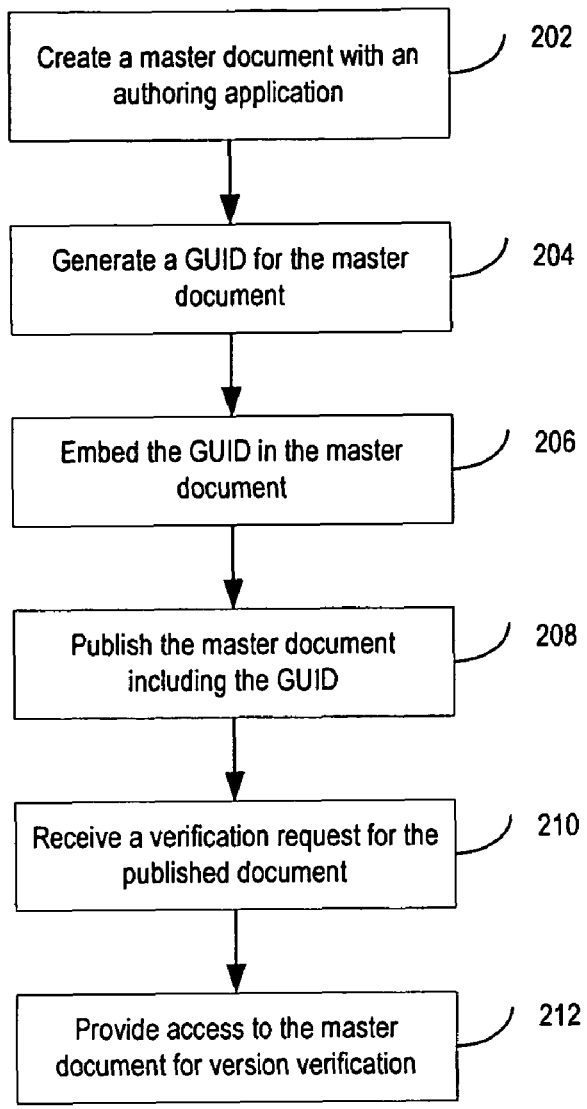
FIG. 2 depicts an exemplary flowchart according to another embodiment of the present invention.

FIG. 2 illustrates a second embodiment. The second embodiment is similar to the embodiment depicted in FIG. 1, except that in block 208 the master document is published with its embedded GUID.

Figure 3:
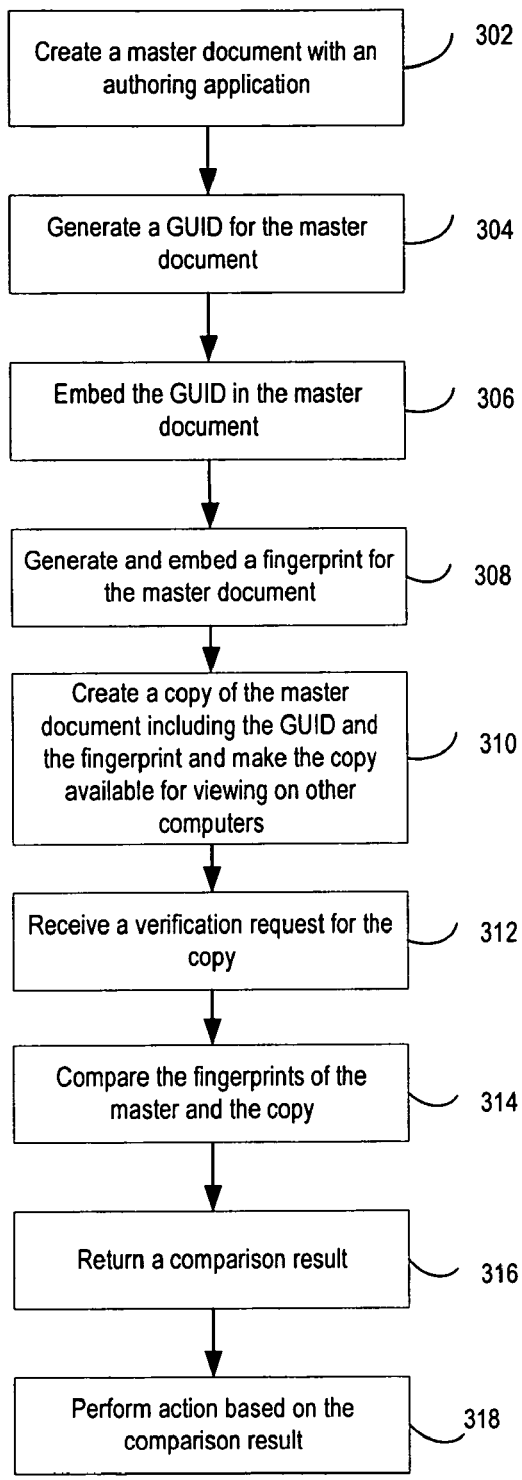
FIG. 3 depicts an exemplary flowchart according to another embodiment of the present invention.

FIG. 3 illustrates a third embodiment. The third embodiment is similar to the embodiment depicted in FIG. 1, with the addition of a fingerprint. In block 308, a fingerprint is generated and embedded in addition to the GUID. The fingerprint may be, for example, a checksum of the master document; a version number assigned by a document management system; or a last modified date in the master document. While the GUID may generally refer to a document throughout its lifecycle, the fingerprint may uniquely identify the content of a document, e.g. a specific version of a document.

In block 310, both the GUID and the fingerprint may be embedded in a copy of the master document, and the copy is made available for viewing on other computers as described above in reference to FIG. 1.

In block 312, the version verification request from a viewer of the copy may include both the GUID and the fingerprint from the copy.

In block 314, the original computer may use the GUID to locate the correct master document, and then compare the fingerprints of the master document and the copy. In one embodiment, the original computer may calculate a new fingerprint for the master document and compare the new fingerprint to the fingerprint from the copy. The comparison may be performed by the authoring application, by the operating system, by a document management system, or some other computer system. In block 316, the result of the comparison is returned to the requesting computer.

In block 318, some action may be performed based on the comparison result. For example, the user may be prevented from viewing an outdated copy. Or, the original computer may provide a copy of the up-to-date master document. The user may receive a warning that the copy is not up-to-date. If the user tries to print an outdated copy, a watermark may be applied to the printed copy, indicating that the version is outdated. Other actions may also be performed.

Figure 4:
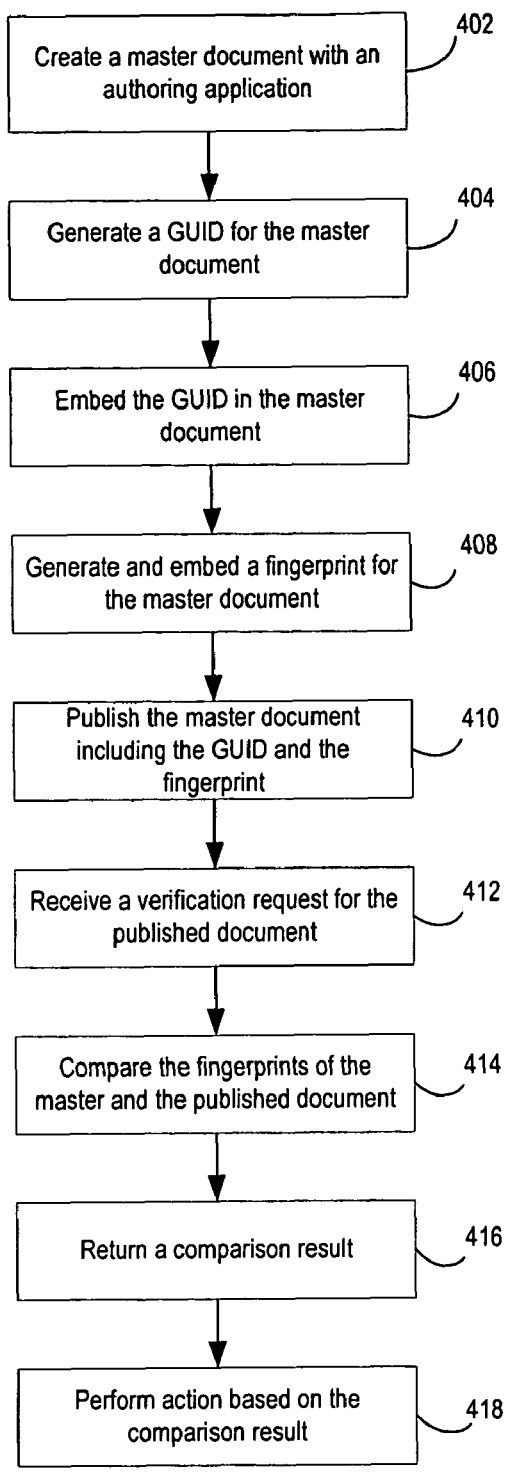
FIG. 4 depicts an exemplary flowchart according to another embodiment of the present invention.

FIG. 4 illustrates a fourth embodiment. The fourth embodiment is similar to the third embodiment, except that in block 410, the master document is published with its embedded GUID and fingerprint In any of the embodiments, the version verification request may be initiated by the user, or automatically. In some embodiments, a verification service may be provided that is accessible to the applications on the user's computer, and in communication with the originating computer.

This process may also be invoked at the user's request. Furthermore, a user may be notified of the specific page range, page or section of page that has changed. This may be accomplished by including multiple fingerprints for each document GUID where each fingerprint corresponds to a page, a sheet or a sub-section of the document. For example, in a word processing document that contains multiple sections, a separate fingerprint may be generated, e.g. by calculating a checksum for a specific section, rather than for the whole document.

Figure 5:
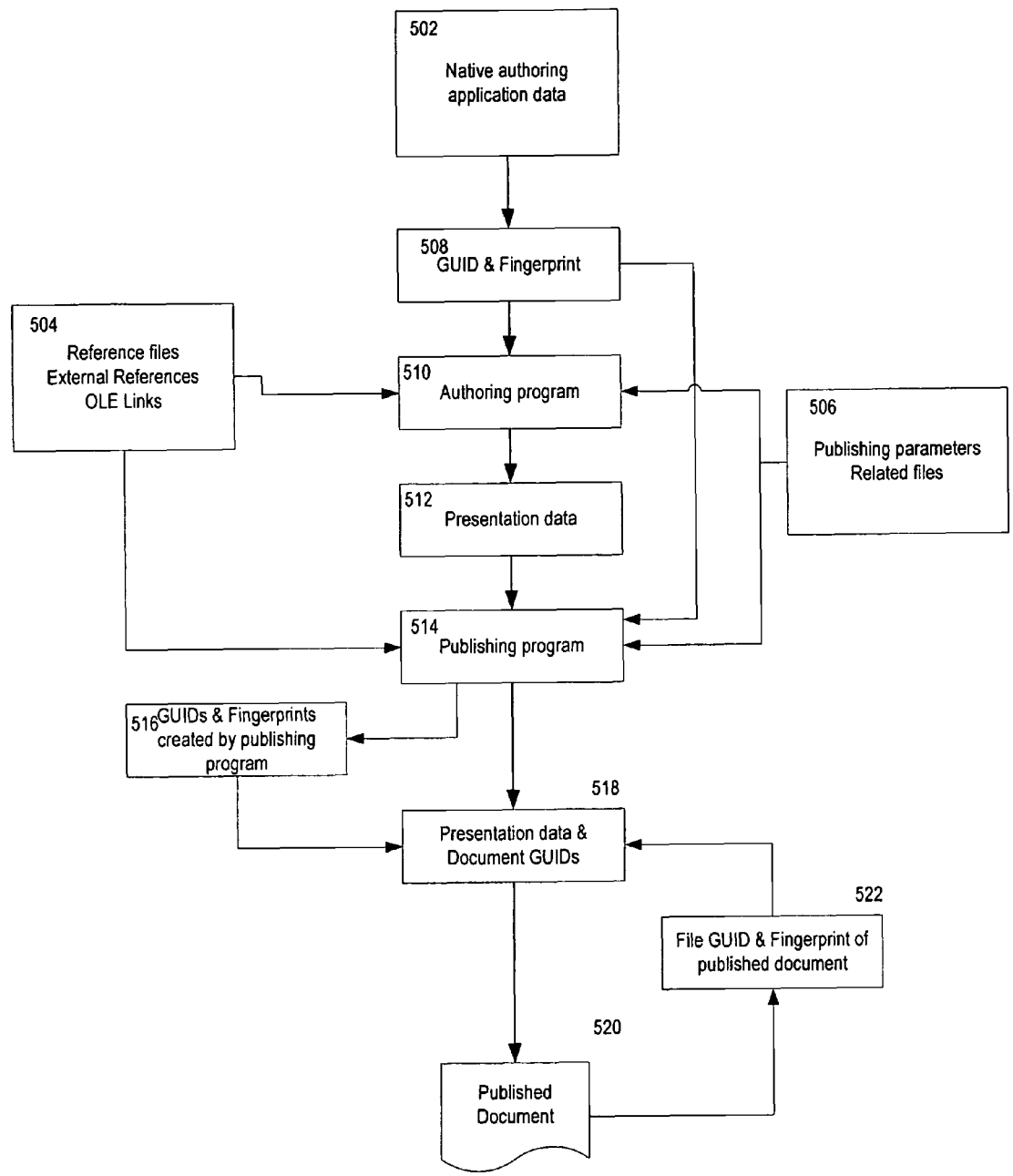
FIG. 5 depicts an exemplary block diagram according to embodiments of the present invention.

FIG. 5 illustrates a block diagram of an embodiment of the invention. An authoring application 510 may use native authoring application data 502, references files, references to external documents, and/or object linking and embedding (OLE) links 504 to generate both a GUID and a fingerprint 508 for a master document (not shown). A GUID and fingerprint may also be generated for each document that the master document links to or has embedded in it. A version verification request for the master document may also include a request for verifying the GUID and fingerprint of the external files 504. The authoring program 510 may use all files related to a master document to generate presentation data 512, which may allow the master document to present data from multiple sources. A verification service may automatically find each dependent file via its GUID, generate a new fingerprint from the native application data or dependent file and compare the new fingerprint to the fingerprint embedded in the published document. If any of the newly calculated fingerprints do not match the fingerprints cached in the published document, the application data had changed and the published document is out of date.

If the master document is to be published, the publishing program 514 may use the external references 504 and publishing parameters 506 to publish the master document. The publishing program 514 may generate the GUID and fingerprint 516 if the authoring application does not. The publishing program 514 may also assemble a published document 520 from the presentation data and the document GUIDs 518 from multiple documents. A user of the published document 520 may navigate back to the original documents via the file GUID and fingerprint of the published document 522.

Figure 6:
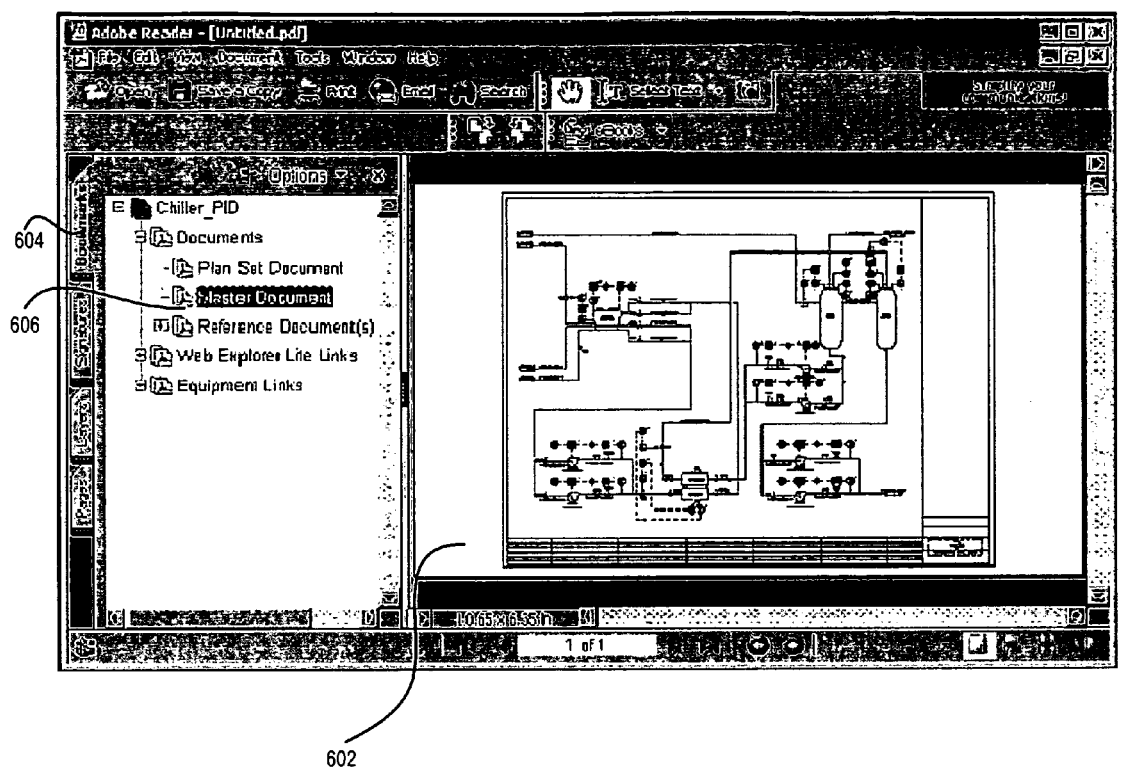
FIG. 6 depicts an exemplary published document according to embodiments of the present invention.

Once the published document file is created with an embedded GUID, the GUID may be exploited by the user allowing navigation back to the native application data. FIG. 6 illustrates an embodiment of the invention where a document 602 is published as a PDF file. FIG. 6 shows a PDF file that exposes bookmarks 604 that enable navigation to the native application data, in this case MicroStation DGN data that was used to create the published document in PDF. By selecting one of the bookmarks 606 in the documents bookmark hierarchy, the user may navigate to the native DGN data. The native DGN data includes both the master and reference files. It also includes the ability to navigate back to the publishing parameters stored in a PDF Composer/InterPlot Organizer .ips file. Because a URL is used for the GUID and Adobe's PDF viewers know how to process a URL, no special development is required for navigation. Once the user selects the bookmark, Adobe reader starts an instance of Internet Explorer passing it the URL.

Figure 7:
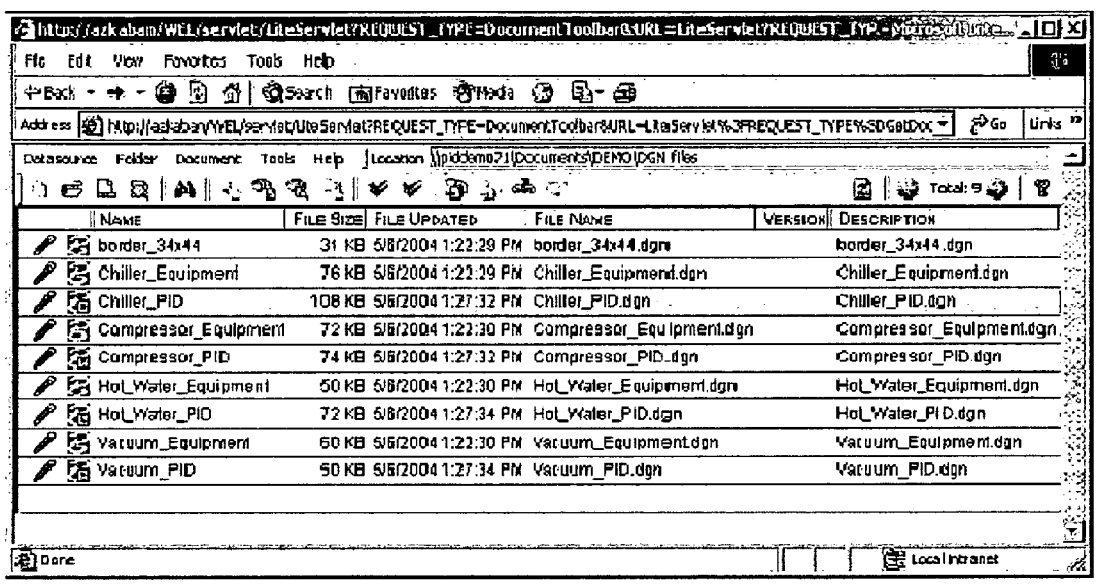
FIG. 7 depicts an exemplary presentation of a master document for version verification according to embodiments of the present invention.

FIG. 7 shows the presentation of the Master DGN file (Chiller.dgn) to the user via ProjectWise Web Explorer Light (WEL) and Internet Explorer. Once in the ProjectWise environment, the user can verify that they are using current information.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A computer-readable medium containing software that, when read by a computer, causes the computer to perform a method for tracing an electronic document, the method comprising:
    on the computer, electronically generating a global unique identifier (GUID) for an electronic master document;
    electronically embedding the GUID in the electronic master document;
    electronically making an electronic copy of the electronic master document available for viewing on another computer, wherein the electronic copy of the electronic master document includes the embedded GUID;
    electronically receiving a version verification request from the other computer about the electronic copy, wherein the version verification request includes the GUID from the electronic copy; and
    electronically providing a latest version of the electronic master document referenced by the GUID from the electronic copy to the second computer in response to the version verification request.

2. The computer-readable medium of claim 1, wherein electronically generating the GUID includes:
    selecting at least one of: a machine host address for the first computer and a document identifier for the electronic master document, or a name of a document management system (DMS) server and a document identifier of the electronic master document in the DMS.

3. The computer-readable medium of claim 1, wherein the method further comprises:
    visually comparing the latest version of the electronic master document and the electronic copy on the other computer.

4. The computer-readable medium of claim 1, wherein the method further comprises:
    performing a software comparison between the latest version of the electronic master document and the electronic copy.

5. The computer-readable medium of claim 1, wherein electronically making an electronic copy of the electronic master document available for viewing includes publishing the electronic master document in a published format different from a native format for the electronic master document and including the GUID in the published document.

6. The computer-readable medium of claim 5, wherein the publishing comprises creating the copies in at least one of: a CALS format, a TIFF format, a PDF format, a DWF format, or a Metro format.

7. The computer-readable medium of claim 1, wherein electronically generating a GUID for the electronic master document includes generating a GUID for each document embedded in or linked to the electronic master document.

8. The computer-readable medium of claim 7, wherein electronically embedding the GUID in the electronic master document includes embedding the GUIDs for each document embedded in or linked to the electronic master document.

9. A computer-readable medium containing software that, when read by a computer, causes the computer to perform a method for tracing an electronic document, the method comprising:
    on the computer, electronically generating a global unique identifier (GUID) for an electronic master document;
    electronically generating a fingerprint for the electronic master document;
    electronically embedding the GUID and the fingerprint in the electronic master document;
    electronically making an electronic copy of the electronic master document available for viewing on another computer, wherein the electronic copy of the electronic master document includes the embedded GUID and fingerprint;
    electronically receiving a version verification request from the other computer about the electronic copy, wherein the version verification request includes the GUID and the fingerprint from the electronic copy;
    electronically comparing the fingerprints from the electronic copy and the electronic master document referred to by the GUID from the electronic copy; and
    returning a comparison result to the other computer.

10. The computer-readable medium of claim 9, wherein the electronically comparing further comprises:
    generating a new fingerprint for the electronic master document;
    comparing the fingerprint in the version verification request to the new fingerprint; and
    indicating that the electronic master document has been revised when the fingerprint in the version verification request and the new fingerprint are not identical.

11. The computer-readable medium of claim 9, wherein electronically generating the fingerprint includes at least one of:
    calculating a checksum of the electronic master document;
    selecting a version number of the electronic master document assigned by a document management system; or
    selecting a last modified date in the electronic master document.

12. The computer-readable medium of claim 9, wherein electronically making copies of the electronic master document available comprises publishing the electronic master document and including the GUID in the published document.

13. The computer-readable medium of claim 12, wherein the publishing comprises creating the electronic copies in at least one of: a CALS format, a TIFF format, a PDF format, a DWF format, or a Metro format.

14. The computer-readable medium of claim 9, wherein electronically generating a GUID and a fingerprint for the electronic master document includes generating a GUID and a fingerprint for each document embedded in or linked to the electronic master document.

15. The computer-readable medium of claim 14, wherein electronically embedding the GUID and the fingerprint in the electronic master document includes embedding the GUIDs and fingerprints for each document embedded in or linked to the electronic master document.

16. The computer-readable medium of claim 9, further comprising electronically generating a fingerprint for a subsection of the electronic master document.

17. The computer-readable medium of claim 9, further comprising:
- performing at least one of the following when the comparison result indicates that the copy and the electronic master document are not the same version:
- denying the ability to view the copy;
- providing a copy of the latest version of the electronic master document;
- presenting a warning that the copy is not the latest version of the electronic master document; or
- applying a watermark on a printed copy of the copy.

18. The computer-readable medium of claim 1, further comprising electronically receiving an updated version of the electronic master document after making the copy; and wherein the version verification request is a request to receive the latest version of the electronic master document.

19. The computer-readable medium of claim 9, further comprising receiving an updated version of the electronic master document after making the copy; and wherein the version verification request is a request to determine if there is an updated version of the electronic master document.

20. A computer-readable medium containing computer readable program code that, when read by a computer, causes the computer to perform a method for tracing an electronic document, the method comprising:
- on the computer, electronically generating a global unique identifier (GUID) for an electronic master document;
- electronically embedding the GUID in the electronic master document;
- electronically making an electronic copy of the electronic master document available for viewing on another computer, wherein the electronic copy of the electronic master document includes the embedded GUID;
- automatically generating a version verification request including the GUID at the other computer;
- electronically receiving the version verification request from the other computer about the electronic copy; and
- electronically providing a latest version of the electronic master document referenced by the GUID from the electronic copy to the second computer in response to the version verification request.

* * * * *